United States Patent [19]

Chou et al.

[11] Patent Number: 4,900,522
[45] Date of Patent: Feb. 13, 1990

[54] SEPARATION OF NICKEL AND COBALT FROM SULFATE SOLUTIONS BY SOLVENT EXTRACTION

[75] Inventors: Eddie C. Chou; Leo W. Beckstead, both of Arvada, Colo.

[73] Assignee: Amax Inc., Greenwich, Conn.

[21] Appl. No.: 888,310

[22] Filed: Jul. 22, 1986

[51] Int. Cl.$^4$ .................. C01G 51/00; C01G 53/00
[52] U.S. Cl. ........................ 423/139; 423/DIG. 14; 75/101 BE; 75/119; 210/688
[58] Field of Search ............... 75/101 BE, 119; 423/139, DIG. 14; 210/688

[56] References Cited

U.S. PATENT DOCUMENTS

| | | | |
|---|---|---|---|
| 4,196,076 | 4/1980 | Fujimoto et al. | 423/139 |
| 4,528,167 | 7/1985 | Preston | 423/139 |

Primary Examiner—Robert L. Stoll
Attorney, Agent, or Firm—Michael A. Ciomek; Eugene J. Kalil

[57] ABSTRACT

Sulfate solutions containing nickel and cobalt ions are treated by solvent extraction to provide a nickel raffinate with a high Ni:Co ratio and a cobalt raffinate with a high Co:Ni ratio and with low recycle of cobalt by treating the solution with a cobalt extractant to provide a nickel raffinate of high Ni:Co ratio and a loaded extractant, acid stripping the loaded extractant to provide a cobalt sulfate solution containing some nickel and a regenerated cobalt extractant, treating the cobalt sulfate solution with a nickel extractant to provide a cobalt raffinate with a high Co:Ni ratio and acid stripping the loaded nickel extractant to regenerate the extractant and to provide a recyclable sulfate solution containing only a small proportion of the original cobalt.

5 Claims, 1 Drawing Sheet

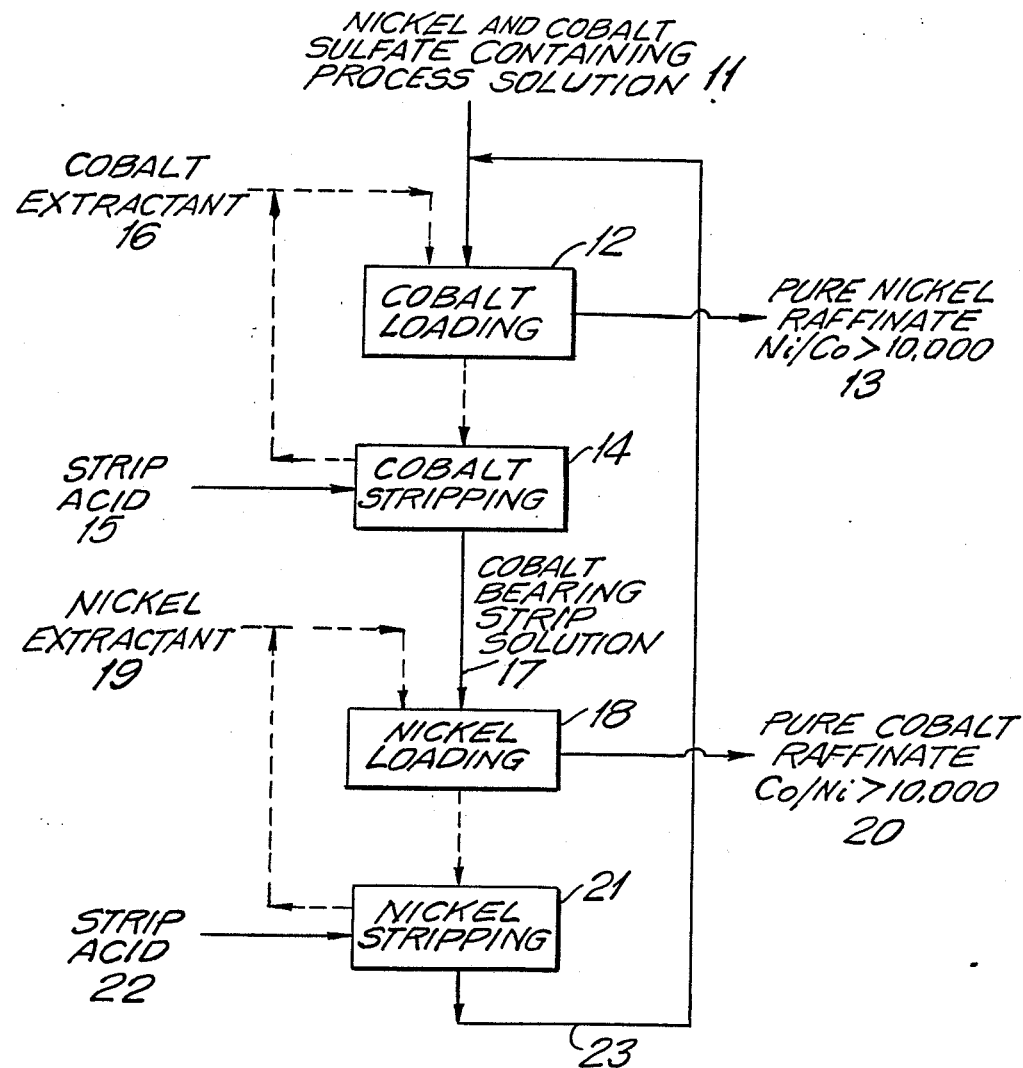

SEPARATION OF NICKEL AND COBALT FROM SULFATE SOLUTIONS BY SOLVENT EXTRACTION

BACKGROUND OF THE INVENTION AND THE PRIOR ART

Nickel and cobalt occur together in many ores of both the oxide type and the sulfide type. Extraction by sulfuric acid leaching is a common practice in treating ores such as those found in Moa Bay in Cuba. Such leaching results in aqueous sulfate solutions containing the nickel and cobalt, together with other leachable constituents of the ore. It is commercially desirable that a nickel product as low as possible in cobalt and a cobalt product as low as possible in nickel be provided from such leach solutions. Of course, both the nickel product and the cobalt product should be as low as possible in other impurities which may be copresent in the sulfate solution.

The separation of nickel and cobalt from such sulfate solutions has been studied by many investigators for years. In the commercialized Outokumpu process, a portion of the Ni-Co solution is neutralized with NaOH, and nickelous hydroxide is precipitated. The precipitate is then electrolytically oxidized to nickelic hydroxide. The nickelic hydroxide is filtered, washed, and used for precipitation of cobaltic hydroxide from the main solution stream to result in a pure nickel solution. However, the cobaltic hydroxide that is formed usually has a cobalt-to-nickel ratio of about 1:1 to 5:1 and must be further processed to generate pure cobalt solution. Commercially, a Pentammine process is used for that purpose. This process consists of dissolution of Co-Ni hydroxide, ammoniation of the resulting solution, oxidation of Co(II) to Co(III), and removal of Ni(II) by Pentammine crystallization and ion exchange. The purified cobaltic solution is then reduced to the cobaltous state prior to cobalt recovery by electrowinning or hydrogen reduction. The overall process is complicated and costly. Recently, an ammonium persulfate process was developed by AMAX to replace the Outokumpu process. However, a simple process for replacing the Pentammine process is still needed.

Solvent extraction to remove cobalt from nickel in sulfate solution using esters, salts, and other organic derivatives of phosphoric acid as selective extractants is known. For improving the separation factor between cobalt and nickel, new cobalt extractants such as derivatives of phosphonic and phosphinic acids have been developed. Using these extractants, cobalt can be removed from nickel sulfate solutions readily, but purified cobalt solution cannot be generated directly from the loaded extractants. The cobalt-loaded phosphonic or phosphinic extractant usually has a cobalt-to-nickel ratio of about 5 to 50. In order to increase the ratio to 10,000, a cobalt-rich solution must be used to scrub the loaded extractant within a very limited pH range. There are several disadvantages in performing the scrubbing: (1) The scrubbed aqueous usually is recycled to the extraction stage. The amount of cobalt recycled may be as high as about 50 percent of the cobalt in the original feed solution. (2) For effective extraction of cobalt in the extraction stage, the organic-to-aqueous ratio (O/A) usually is about 0.5 to 1. At this O/A ratio, a large quantity of organic must be processed through the extraction, as well as the scrubbing stage. Thus, the capital and operating costs are high. (3) The pH control for selective extraction of cobalt in the loading stage and selective scrubbing of nickel in the scrubbing stage is very critical. Usually, such close pH control is not easy to implement in an integrated circuit.

It is to be appreciated that the leach solutions resulting from sulfuric acid leaching of oxide ores tend to be relatively dilute, e.g., such leach solutions may contain only about six grams per liter of nickel and about 0.6 grams per liter of cobalt even when leaching is conducted at elevated temperature and pressure using 98% sulfuric acid at 450°–500° F. Treatment of such dilute solutions by solvent extraction would not be economic because of the great volume of solution involved. Accordingly, it is desirable to concentrate the metal content of the solution beforehand. This may be done by precipitating the nickel and cobalt as sulfides under conditions which inhibit precipitation of iron as sulfide. The precipitate is separated from the spent solution and may be redissolved in sulfuric acid to yield a sulfate solution containing about 50 to 150 gpl nickel and 1 to 5.0 gpl cobalt.

Those skilled in the art know that reagents which display a selective affinity for cobalt over nickel will still coextract some nickel and possibly other metal ions such as copper or iron while extracting cobalt and that nickel-selective extractants will coextract some cobalt and possibly other metal ions. It is also known that the reagents used in solvent extraction are usually employed in solution in a water-immiscible organic solvent such as kerosene. In addition, it is known that the cobalt-selective extractants are comparatively more selective than are the nickel-selective extractants.

The invention is directed to separation of cobalt and nickel from a sulfate solution containing both ions in various proportions wherein the amount of cobalt recycle is significantly reduced as compared to solvent extraction processes wherein scrubbing of the loaded organic is employed in the conventional manner.

BRIEF DESCRIPTION OF THE DRAWING

The drawing represents a schematic flowsheet of the extraction process embodying the invention.

SUMMARY OF THE INVENTION

In accordance with the invention, an aqueous sulfate solution containing nickel and cobalt is first treated with an organic extractant for cobalt to yield a nickel raffinate having a high nickel:cobalt ratio and a loaded cobalt extractant which is then stripped with acid to regenerate the cobalt extractant and an aqueous sulfate solution containing the extracted cobalt and some nickel, then treating the resulting aqueous solution with an organic extractant for nickel to produce a cobalt raffinate having a high cobalt:nickel ratio and a loaded nickel extractant, stripping the loaded nickel extractant to yield a regenerated extractant and an aqueous sulfate solution containing cobalt and nickel which may be recycled to the cobalt extraction step with only a small amount of cobalt thereby being recycled.

DETAILED DESCRIPTION OF THE INVENTION

The invention will now be described in conjunction with the drawing in which reference character 11 denotes the nickel-cobalt sulfate solution to be treated. In general terms, the solution may contain about 50 to about 150 grams per liter (gpl) nickel, about 1 to about 5 grams per liter cobalt, up to about 0.5 gpl calcium, up to about 1 gpl magnesium, up to about 20 gpl ammonium sulfate and will have a pH of about 3 to about 6. Preferably, the solution will contain about 90 to about 110 gpl nickel, about 1 to about 2 gpl cobalt and will contain no more than about 500 ppm of impurities from the group consisting of iron, copper, zinc, calcium and magnesium and will have a pH of about 5.5 to about 6. About 0 to about 15 gpl ammonium sulfate may be present.

Solution 11 is contacted with cobalt extractant 16 in cobalt loading step 12, which may be conducted in stages to yield a nickel raffinate 13 which may have a nickel:cobalt ratio exceeding 10,000, and a loaded organic which is conducted to stripping step 14. Strip acid 15, which may be sulfuric acid having a concentration of about 0.1 to about 2 normal is fed to stripping operation 14 to regenerate cobalt extractant 16 for recycle to cobalt loading step 12 and a cobalt bearing sulfate solution 17 which is conducted to nickel loading step 18 in which it is contacted with nickel extractant 19 to yield cobalt raffinate 20 which may have a cobalt:nickel ratio exceeding 10,000. The nickel loaded organic from step 18 is conducted to nickel stripping operation 21 into which strip acid 22, e.g., a sulfuric acid solution of about 0.1 to about 2 normal, is fed to regenerate nickel extractant 19 for reuse and a sulfate solution 23 containing nickel and cobalt which may be recycled to feed solution 11. In general terms the recyclable solution 23 will contain no more than about 10%, e.g., no more than about 5% of the cobalt originally contained in process solution 11.

It is to be appreciated that nickel loading step 18 may also be conducted in stages. It is also to be appreciated that solution volumes decrease drastically as the process proceeds. Thus, in respect of a solution initially containing 100 gpl nickel and 2 gpl cobalt on the basis of 100 volume parts of initial solution, nickel raffinate would represent 97 volume parts, cobalt raffinate would represent 2 volume parts and recycle solution from nickel stripping 21 would represent 1 volume parts. Strip acid 15 and 22 would add volume. No scrubbing of loaded organic is used.

An example will now be given:

A feed solution containing 100 gpl nickel, 2 gpl cobalt, 12 gpl ammonium sulfate, 5 ppm iron, 10 ppm copper, 20 ppm zinc, 150 ppm calcium, 60 ppm magnesium and having a pH of 5.5 was contacted in 4 stages with the cobalt extractant 15 vol % C-272 (a phosphinic extractant) in Kermac 627. A nickel raffinate having a nickel:cobalt ratio exceeding 10,000 was produced. The loaded organic was stripped with 2 M sulfuric acid and a sulfate solution containing 58.7 gpl cobalt and 38 ppm nickel resulted. The solution (Co:Ni 1544:1) was contacted twice at pH 3 with an organic extractant containing 1.8 volume percent of alpha-bromolauric acid and 4 volume percent of 3,7 dimethyl octanal oxime in Escaid 200. The organic-aqueous ratio was 0.5/1.0 and temperature was 20° C. After the second contact, the aqueous solution contained 57.3 gpl cobalt and 0.001 gpl nickel giving a Co:Ni of 57,300. Cobalt extraction in the organic, representing the amount to be recycled, was only 2.4%.

Conventional cobalt extractants which may be employed in accordance with the invention include di (2 ethylhexyl) phosphoric acid (DEHPA), 2-ethylhexyl phosphonic acid mono-2-ethylhexyl ester, 2-ethylhexyl benzylphosphonic acid, Bis (2,4,4, trimethylpentyl) phosphinic acid, and their salts, nickel extractants which may be used include non-chelating oximes which may be mixed with DEHPA and/or alpha-bromolauric acid. The extractants are used in solution with water-immiscible organic solvents such as kerosene.

In contrast to the simple flowsheet described, a five week campaign was conducted treating a sulfate solution which contained 90–105 gpl nickel, 1.5–2.6 gpl cobalt, 10–15 gpl ammonium sulfate, 80–250 ppm calcium, 10–100 ppm magnesium, 2–30 ppm copper, 3–40 ppm zinc, 2–10 ppm iron and a pH of 5.5–6.1 in a circuit which employed scrubbing of the organic with a cobalt sulfate solution containing cobalt in the range of 16 to 20 gpl. The cobalt extractant was C-272 in Kermac 627. It was found that the cobalt recycle varied from a low of 13% to a high of 92% with an average of about 46%. Sharp day-to-day variations, e.g., from 94% one day to 22% the next were observed. The variations were attributed to process difficulties in maintaining pH at the scrub operation.

The flowsheet envisioned in accordance with the present invention is much simpler than a scrubbing-type flow sheet, is not subject to variations in the amount of cobalt recycle due to pH variation, requires less pumping of solutions and is generally more effective.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The process for separating nickel and cobalt contained in aqueous sulfate solution which comprises treating said solution with an organic extractant for cobalt from the group consisting of organic phosphonic and phosphinic acids to provide a loaded organic solution containing the cobalt and a nickel raffinate having a nickel:cobalt ratio exceeding 10,000, stripping the cobalt loaded organic with aqueous sulfuric acid solution to regenerate said cobalt extractant and provide a cobalt strip solution containing cobalt and nickel as sulfate, treating said cobalt strip solution with an organic extractant for nickel essentially consisting of a non-chelating oxime with or without a compound from the group consisting of di(2-ethylhexyl) phosphoric acid and alpha-bromolauric acid to provide a cobalt raffinate having a cobalt:nickel ratio exceeding 10,000 and a loaded organic solution containing nickel, stripping said nickel-loaded organic with aqueous sulfuric acid solution to regenerate said nickel extractant and an aqueous sulfate solution containing nickel and cobalt which may be recycled to said cobalt extraction step to provide a solvent extraction process for separating nickel and cobalt in which no scrubbing operations are employed and in which cobalt recycle is minimized.

2. The process in accordance with claim 1 wherein said aqueous sulfate solution contains about 50 to about 150 gpl nickel, about 1 to about 5 gpl cobalt, up to about 15 gpl ammonium sulfate, up to about 500 ppm calcium, up to about 1000 ppm magnesium, up to about 50 ppm copper, up to about 50 ppm zinc, up to about 20 ppm iron, and has a pH of about 3 to about 6.

3. The process in accordance with claim 1 wherein said aqueous sulfate solution contains about 90 to about 110 gpl nickel, about 1 to about 2 gpl cobalt, about 0 to about 15 gpl ammonium sulfate, about 80 to about 250 ppm calcium, about 10 to about 100 ppm magnesium, about 2 to about 30 ppm copper, about 3 to about 40 ppm zinc, about 2 to about 10 ppm iron and has a pH of about 5.5 to 6.0.

4. The process in accordance with claim 1 wherein said cobalt extractant is selected from the group consisting of di (2 ethylhexyl) phosphoric acid, 2-ethylhexyl phosphonic acid mono-2-ethylhexyl ester, 2-ethylhexyl benzylphosphonic acid, Bis (2,4,4, trimethylpentyl) phosphinic acid and salts thereof.

5. The process in accordance with claim 1 wherein said nickel extractant is a mixture of a non-chelating oxime and a compound from the group consisting of di (2-ethylhexyl) phosphoric acid and alpha-bromolauric acid.

* * * * *